United States Patent Office 3,020,246
Patented Feb. 6, 1962

3,020,246
CARBON-NITROGEN POLYMERS AND METHOD OF PREPARING SAME
William L. Fierce, Crystal Lake, and Walter J. Sandner, Carpentersville, Ill., assignors to The Pure Oil Company, Chicago, Ill., a corporation of Ohio
No Drawing. Filed May 28, 1959, Ser. No. 816,391
3 Claims. (Cl. 260—2)

This invention relates to new and useful improvements in methods for preparing carbon-nitrogen polymers, and more particularly to an improved method for polymerizing cyanogen by heating an anhydrous mixture of cyanogen and ammonia to a temperature of 100°–400° F.

Cyanogen $(CN)_2$, is a well-known compound which is useful as an organic intermediate, and because of its high toxicity has found some use an a fumigant. In recent years, cyanogen has been evaluated as a rocket propellant and found to have only marginal value because of its toxicity and its extremely high combustion temperature (cyanogen and oxygen burn with the hottest flame produced by a chemical reaction). The construction materials presently used in rocket engines cannot handle the high temperature produced by a cyanogen flame and the toxicity of the compound is a substantial obstacle to its utilization. One possible solution to the problems of using cyanogen as a rocket fuel lies in converting it to a solid polymer. At the present time, solid propellants are widely used in both military and non-military rockets. It has been thought that solid polymers of cyanogen might be less toxic and have a sufficiently reduced flame temperature as to be useful as a rocket fuel.

Tricyanotriazine, which is also cyanuric cyanide, is generally considered to have the following structure:

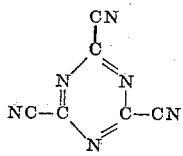

Because each molecule contains three molecules of $(CN)_2$, and nothing else, tricyanothiazine can be considered to be a trimer of cyanogen. However, in spite of having this in common with other cyanogen polymers, tricyanotriazine has never been prepared by the condensation or polymerization of cyanogen. The nitrile (or cyanide) group in organic compounds is unsaturated in character and is highly reactive. Many of the reactions of the nitriles depend upon the ability of the carbon-nitrogen bond to add other groups. Examples of the reactions which involve such addition are the hydrolysis of nitriles to carboxylic acids and the formation of iminoethers by reaction with alcohols. The tendency of many nitriles to polymerize under the influence of certain reagents is another example of this reactivity at the carbon-nitrogen triple bond. Although this tendency is shown by all types of nitriles, the polymeric products differ in type depending upon the type of nitrile, and the conditions under which polymerization takes place. In numerous cases, nitriles polymerize to form trimeric polymerization products in which three nitrile groups combine to form the triazine ring:

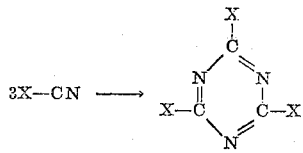

where X is any radical. However, polymerization of this type does not take place when a CH or $CH_2$ group is attached to the cyanide group. Among the compounds which are known to polymerize to form the triazine ring are: cyanogen chloride, benzonitrile, trichloroacetonitrile, cyanic acid, and cyanamide. On the other hand, polymerization to form the triazine ring has never been reported for cyanogen, hydrogen cyanide, acrylonitrile, acetonitrile, or propionitrile. The polymerization to tricyanotriazine has been accomplished only by means of a multistep process involving: (1) dehydration of ethyl oxamate to ethyl cyanoformate, (2) polymerization of ethyl cyanoformate to triethylcarboxytriazine, (3) aminolysis of the triazine product to the corresponding amide, and (4) dehydration of the amide to tricyanotriazine. See E. Ott, Ber., 52, 660 (1919).

Cyanogen, however, is known to polymerize to form a material known as paracyanogen, a black, highly inert solid of high molecular weight. The properties of this solid are relatively well defined and numerous methods for its preparation have been reported. Paracyanogen is believed to be a long ribbon-shaped molecule, of indefinite length and molecular weight, of the general formula:

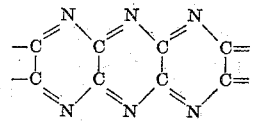

Paracyanogen is a dark, brownish-black solid material which is insoluble in water, organic solvents, and liquid cyanogen. It is insoluble in nitric acid but is partially soluble in strong caustic solution. It is reported that paracyanogen dissolves in cold, concentrated sulfuric acid and can be recovered unchanged as a precipitate by diluting with water. It can be completely converted into cyanogen gas by heating to about 860° C. in a current of an inert gas such as nitrogen or helium. The molecular weight of paracyanogen is unknown and, in fact, indefinite, and so it is commonly designated as $(CN)_x$.

Many methods for the preparation of paracyanogen have been reported—V. Migrdichian, "The Chemistry of Organic Cyanogen Compounds," 1947, p. 362; H. E. Williams, "Cyanogen Compounds," 1948, p. 4; Beilstein's Handbuch der Organischen Chemie, 2, 511 (1942), Second Supplement; and L. L. Bircumshaw, F. M. Taylor and D. H. Whiffen, J. Chem. Soc., 1954, 931. Some of these methods for preparation of paracyanogen are as follows:

(1) Paracyanogen forms when cyanogen is heated at atmospheric pressure at 310° C., or at lower temperatures under higher pressures. For example, when the pressure is 300 atmospheres, the temperature required is 220° C.

(2) Paracyanogen can be produced by the electrolysis of potassium cyanide solutions.

(3) Photopolymerization of cyanogen has been reported, as has polymerization initiated by alpha-particles.

(4) Heating oxamide at 250°–300° C. in a sealed tube yields paracyanogen.

(5) Both cyanogen and paracyanogen are formed when either silver cyanide or mercuric cyanide is heated in a sealed tube above about 300° C.

It is therefore one object of this invention to provide new and improved carbon-nitrogen polymers which are derived from cyanogen and ammonia.

Another object of this invention is to provide a new and improved method for polymerizing cyanogen by heating an anhydrous mixture of cyanogen and ammonia to a temperature of 100°–400° F.

A feature of this invention is the provision of a new carbon-nitrogen polymer prepared by polymerizing cyanogen by heating in excess ammonia to a temperature of about 100°–400° F.

Another feature of this invention is the provision of an improved method for polymerizing cyanogen by heating in an excess of ammonia to a temperature of 100°–400° F. at a super-atmospheric pressure.

Other objects and features of this invention will become apparent from time to time throughout the specification and claims as hereinafter related.

This invention is based upon our discovery that novel carbon-nitrogen polymers are obtained, which do not have the properties of either tricyanotriazine or paracyanogen, when cyanogen is heated with a molar excess of ammonia to a temperature of 100°–400° F. The polymerization of cyanogen in accordance with this process is preferably carried out using a very substantial molar excess of ammonia, and at super-atmospheric pressures of the order of 30 p.s.i.g. up to as high as several thousand p.s.i.g. Although these conditions are preferred, cyanogen has been found to polymerize in the presence of smaller proportions of ammonia and at pressures as low as atmospheric pressure. The product which is obtained when cyanogen is heated with ammonia is a black, solid polymer which is neither tricyanotrizine or paracyanogen.

The following non-limiting examples are illustrative of the scope of this invention.

Example I

A stainless steel, Aminco bomb was charged with 5.4 g. of anhydrous ammonia and 14.9 g. of cyanogen. The initial pressure was 91 p.s.i.g. The bomb was rocked and heated to 125° F. for 5 hours. Then it was allowed to cool to room temperature and the pressure was found to have dropped to 21 p.s.i.g. The bomb was opened and all volatile matter was allowed to escape into a hood. A black solid weighing 5.3 g. remained. To remove any adsorbed ammonia or cyanogen, the solid was heated at 200° C. in vacuo for 3 hours. The black solid remaining thereafter was odorless and insoluble in all common solvents, except cold concentrated sulfuric acid in which paracyanogen is reported to be soluble.

The standard analytical laboratory techniques for analysis of nitrogen are inaccurate when applied to nitrogen-containing polymers such as paracyanogen and it was therefore impossible to obtain a precise and exact analysis of the polymeric product. However, the black solid polymer obtained in this experiment was analyzed for carbon, nitrogen, and hydrogen, and was subjected to thermal decomposition by heating at 850°–900° C. for a period of 2–3 hours. The analysis of the polymer by conventional means was: 37.2% carbon, 3.5% hydrogen, 54.1% nitrogen, and 5.2% unidentified residue. After heating for 2–3 hours at 850°–900° C. the polymer had decomposed to yield 31.8% cyanogen, 28.6% hydrogen cyanide, and 39.6% unidentified volatile matter, leaving no solid residue. This polymer was also burned in oxygen and found to have a heat of combustion of 6,900 B.t.u./lb. The solid polymers which are produced in this experiment are useful as a solid, high-energy fuel for rocket engines, and are also useful as a non-toxic, solid source for evolving cyanogen and/or hydrogen cyanide.

For comparison, paracyanogen was prepared by heating mercuric cyanide to 590° F. in accordance with prior art. The black, solid paracyanogen which was obtained, analyzed: 36.6% carbon, 1.2% hydrogen, 43.0% nitrogen, and 19.2% unidentified residue. This paracyanogen was also decomposed by heating to 850°–900° C. for a period of 2–3 hours and the thermal decomposition products were analyzed. The non-volatile residue consisted of only 1% of the weight of the paracyanogen. Unidentified volatile matter constituted 46.5% of the weight of the paracyanogen and there was obtained 44.3% cyanogen and 8.2% hydrogen cyanide. This paracyanogen was burned in oxygen and found to have a heat of combustion of 6,860 B.t.u./lb. From these experiments, it is seen that the product which we have obtained is a polymer having properties which are substantially different from the paracyanogen which is obtained in accordance with classical procedures.

Example II

In another experiment, using the same apparatus, the Aminco bomb was charged with 0.52 g. anhydrous ammonia and 14.70 g. of cyanogen. The initial pressure was 91. p.s.i.g. The bomb was rocked and heated for 7 hours at 123° F. The pressure rose to 168 p.s.i.g. The bomb was allowed to cool over night. The next day, the bomb was rocked and heated slowly to 304° F. over a period of 7.5 hours. The pressure rose to 555 p.s.i.g. After each day's heating, the pressure was noted when the bomb had cooled. There was essentially no change from the initial 91 p.s.i.g. Again the bomb was opened and the volatile matter allowed to escape into a hood. A black solid weighing 0.51 g. was removed. Upon analysis, this solid was found to have the same carbon, nitrogen, and hydrogen content as the polymer in Example I. This material, upon thermal decomposition at 850°–900° C., yields essentially the same relative proportions of hydrogen cyanide and cyanogen.

When the polymerization of cyanogen is carried out by heating in the presence of ammonia, it is necessary that a substantial excess of ammonia be present if an appreciable yield of cyanogen polymer is to be obtained. Likewise, it is necessary for the reaction pressure to be substantially above atmospheric if any appreciable yield of the polymer is to be obtained. While cyanogen will polymerize in the presence of ammonia upon heating to 100°–400° F., the yields are not attractive at pressures less than about 30 p.s.i.g. It is therefore preferred that this process be carried out at pressures above 30 p.s.i.g., temperatures of 100°–400° F., and using a substantial excess of ammonia.

While we have described our invention fully and completely, as required by the patent laws, with special emphasis upon several preferred embodiments of the invention, we wish it to be understood that within the scope of the appended claims this invention may be practiced otherwise than as specifically described herein.

What is claimed is:

1. A method of preparing carbon-nitrogen polymers which comprises heating an anhydrous mixture of ammonia and cyanogen, at an ammonia/cyanogen mol ratio in excess of 1, at a pressure greater than about 30 p.s.i.g., to a temperature in the range from about 100°–400° F.

2. A method in accordance with claim 1 in which the mixture is vented after reaction and a black, solid polymer recovered which is insoluble in all common solvents.

3. A polymer produced by heating cyanogen with a molar excess of ammonia to a temperature of 100°–400° F. and a pressure greater than about 30 p.s.i.g., which polymer contains carbon and nitrogen and yields about 32% cyanogen and 29% hydrogen cyanide upon heating to 850°–900° C., and characterized by insolubility in all common solvents.

References Cited in the file of this patent

Jacobsen et al.: Ber., vol. 4, page 949 (1871).